United States Patent [19]
Simizu et al.

[11] Patent Number: 5,130,015
[45] Date of Patent: Jul. 14, 1992

[54] LIQUID PURIFYING ATTACHMENT HAVING PRESSURIZING PISTON

[75] Inventors: Kazuo Simizu; Satoru Matumoto, both of Nagoya; Masashi Endo, Gifu, all of Japan

[73] Assignee: Tomei Sagyo Co., Ltd., Japan

[21] Appl. No.: 662,036

[22] Filed: Feb. 28, 1991

[30] Foreign Application Priority Data

Mar. 3, 1990 [JP] Japan .................... 2-52167

[51] Int. Cl.⁵ ............................................. B01D 35/02
[52] U.S. Cl. ........................... 210/136; 210/321.87; 210/416.3; 210/467; 222/189
[58] Field of Search .............. 210/416.3, 466, 467, 210/468, 500.23, 321.87, 136; 222/189

[56] References Cited

U.S. PATENT DOCUMENTS

| | | | |
|---|---|---|---|
| 629,387 | 7/1899 | Nordmeyer | 210/416.3 |
| 703,654 | 7/1902 | Hall | 210/416.3 |
| 2,436,077 | 2/1948 | Robertson | 210/417.3 |
| 4,975,185 | 12/1990 | Taylor | 210/321.89 |
| 5,019,252 | 5/1991 | Kanei et al. | 210/416.3 |

FOREIGN PATENT DOCUMENTS 62-90706  6/1987  Japan .
62-125804  6/1987  Japan .

Primary Examiner—Robert A. Dawson
Assistant Examiner—Wanda L. Millard
Attorney, Agent, or Firm—Parkhurst, Wendel & Rossi

[57] ABSTRACT

A liquid purifying attachment for dispensing a liquid from a container, which includes a cylinder fluid-tightly attached to the container, and a piston fluid-tightly fitted in the cylinder bore such that the piston is slidably movable between a retracted and an advanced position, relative to the cylinder. The piston and the cylinder define a cylinder chamber into which ambient air is introduced upon movement of the piston toward the advanced position. The introduced air is compressed and fed into the container upon movement of the piston toward the retracted position, to deliver the liquid out of the container, through a filter disposed in a liquid delivery path which is exposed to the ambient air and communicates with the liquid mass.

22 Claims, 9 Drawing Sheets

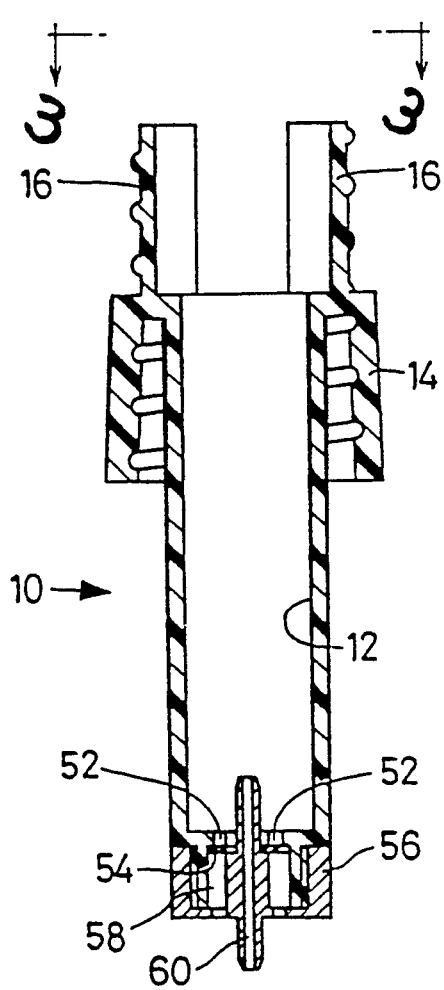
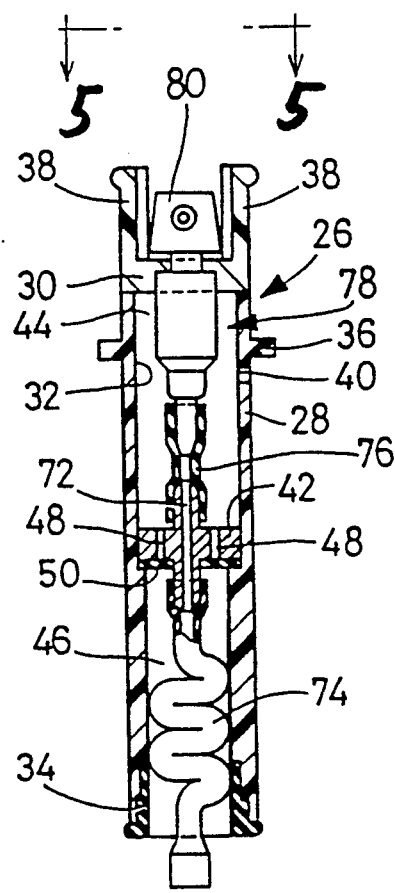
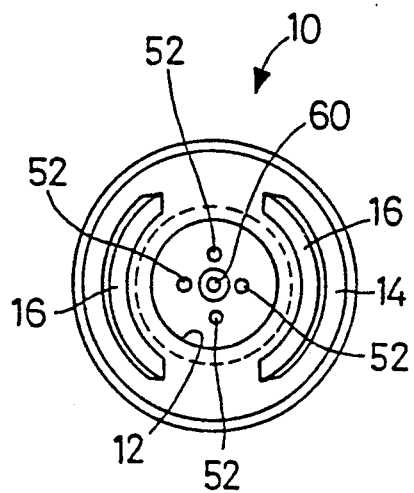
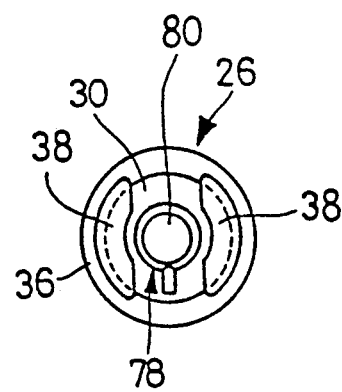
FIG. 2
FIG. 4
FIG. 3
FIG. 5

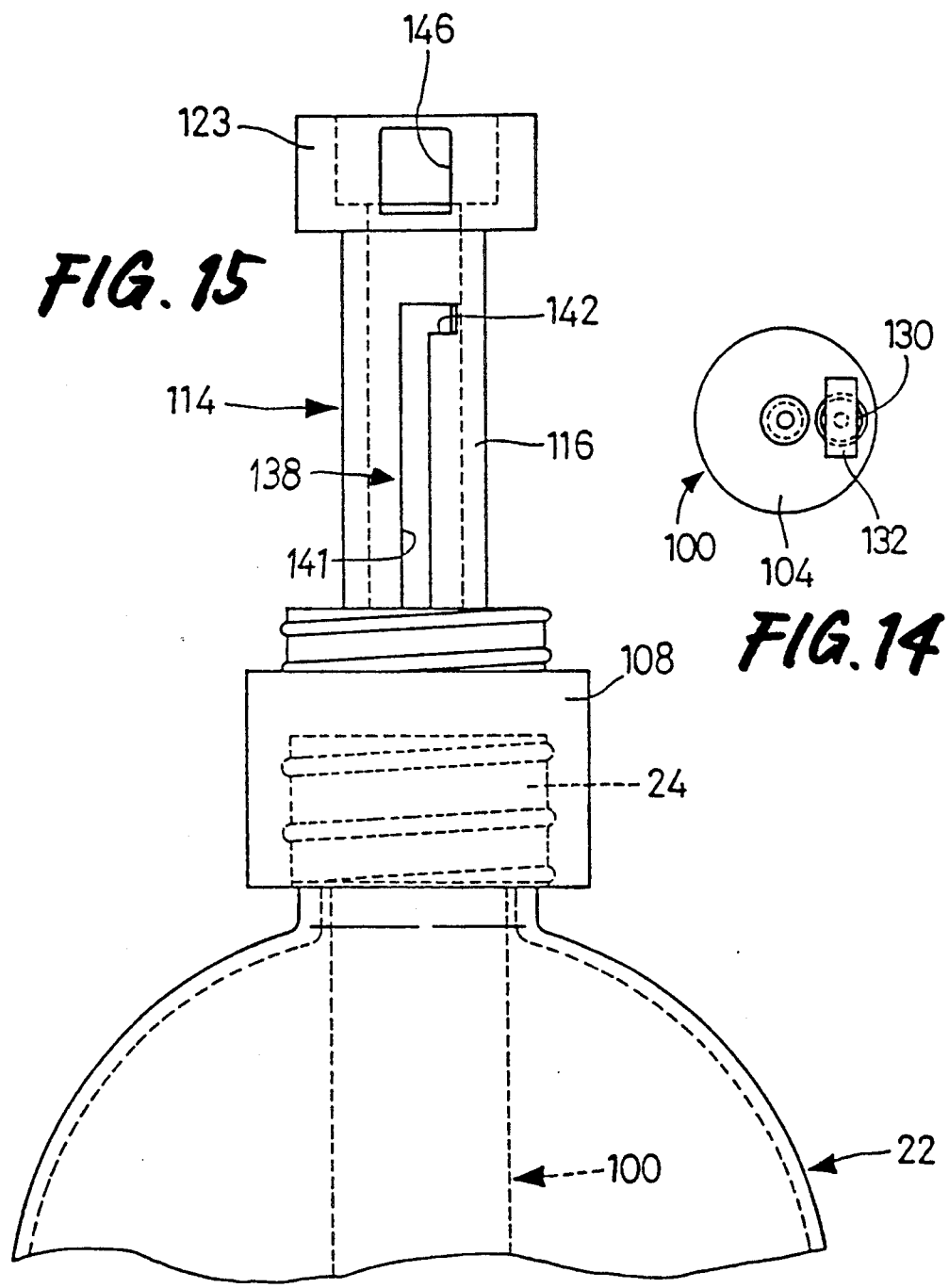

LIQUID PURIFYING ATTACHMENT HAVING PRESSURIZING PISTON

BACKGROUND OF THE INVENTION

1. Field of the Invention

The present invention relates to a liquid purifying attachment which is installed on or attached to a container that accommodates a certain liquid therein, and which is capable of delivering or dispensing the liquid while removing undesired particulate matters, such as soil particles, dust, microorganisms, bacteria, and virus. In particular, the invention is concerned with such a liquid purifying attachment which is simple and compact in construction, and which may be handled or manipulated with ease.

2. Discussion of the Prior Art

There has been a strong desire for a simple liquid purifying device which is used for purifying water from a river, for example, by removing undesired matters such as soil particles, so as to provide sterile water or drinking water for use in an emergency, which is available in the open air. Also is desired such a liquid purifying device for delivering a sterile pharmaceutical liquid which is free from bacteria, for example.

In view of the above, the assignee of the present application proposed liquid purifying devices as disclosed in laid-open Publication Nos. 62-125804 and 62-90706 of unexamined Japanese Patent Application and unexamined Japanese Utility Model Application, respectively. These devices use a container for accommodating a liquid, and a micro-porous membrane disposed in a liquid delivery path. The container is formed of a suitable elastic material so that the container body is elastically contracted by squeezing hand pressure, to deliver the liquid, and is elastically restored to its original shape upon releasing of the hand pressure. The micro-porous membrane permits the liquid to flow therethrough but inhibits passage of undesired particles or bacteria therethrough. In these devices, the bacteria, for example, contained in the liquid are removed or filtered out by the micro-porous membrane provided in the liquid delivery path, when the liquid is delivered or dispensed from the container.

However, the thus constructed liquid purifying device is not able to employ an elastically non-deformable or non-yieldable or relatively rigid container, such as a canteen formed of hard plastics, aluminum alloys, or other hard material, or a pressure-intolerant glass bottle containing a pharmaceutical liquid. Thus, the proposed device has some room for improvements.

In particular, when the liquid purifying device is carried over in the outdoors for providing sterile water or emergency drinking water, for example, the device is required to be compact and handy to carry, while assuring excellent durability.

SUMMARY OF THE INVENTION

The present invention was made in view of the prior art situations described above. It is accordingly an object of the invention to provide a liquid purifying attachment which is suitably installed on or attached to a pressure-intolerant, elastically non-deformable or relatively rigid container formed of a hard material, for purifying a liquid accommodated in the container, and which is simple and compact in construction and highly durable.

The above object may be accomplished according to the principle of the present invention, which provides a liquid purifying attachment for dispensing a liquid, which is attached to a container having an enclosed interior space in which a mass of the liquid is stored, the container including a bottleneck having an opening through which the liquid is introduced, comprising: (a) a cylinder having a mounting portion fluid-tightly attached to the bottleneck of the container, such that the cylinder is partially inserted in the enclosed interior space of the container, the cylinder having a cylinder bore which is open at the mounting portion to an exterior space outside of the container; (b) a piston fluid-tightly fitted in the cylinder bore such that the piston is slidably movable in a longitudinal direction thereof, between a fully retracted and a fully advanced position thereof, relative to the cylinder, the piston cooperating with the cylinder to define a cylinder chamber which is normally fluid-tightly enclosed; (c) means for defining an air inlet passage which communicates with the exterior space and the cylinder chamber, for introducing an ambient air from the exterior space into the cylinder chamber when the piston is moved toward the fully advanced position; (d) first valve means, disposed in the air inlet passage, for permitting a flow of the air therethrough from the exterior space into the cylinder chamber, and for inhibiting a flow of the air therethrough from the cylinder chamber into the exterior space; (e) means for defining a compressed-air supply passage which communicates with the cylinder chamber and the interior space of the container, the air which is compressed in the cylinder chamber being fed into the container through the compressed-air supply passage when the piston is moved toward the fully retracted position; (e) second valve means, disposed in the compressed-air supply passage, for permitting a flow of the compressed air therethrough from the cylinder chamber into the interior space of the container, and for inhibiting a flow of the air therethrough from the interior space into the cylinder chamber; (f) a liquid delivery path including at least a portion formed through the cylinder and the piston so as to extend through the cylinder chamber, the liquid delivery path having one open end adapted to be submerged in the mass of the liquid, and the other open end exposed to the exterior space; (g) third valve means, disposed in the liquid delivery path, for selectively closing and opening the liquid delivery path; and (h) filtering means for purifying the liquid delivered out of the container through the liquid delivery path, the filtering means consisting essentially of a micro-porous membrane filter disposed so as to partially define the liquid delivery path.

The liquid purifying attachment constructed according to the present invention is adapted to be attached to a container which accommodates a mass of a liquid therein. When the piston is reciprocatingly moved in the cylinder bore of the cylinder with the present attachment installed on the container, an ambient air is introduced from the exterior space into the cylinder chamber through the air inlet passage, and the introduced air is compressed in the cylinder chamber, and fed into the interior storage space of the container through the compressed-air supply passage. Due to a rise in the air pressure in the container by the supply of the compressed air, the liquid is delivered out of the container, through the liquid delivery path formed so as to extend through the cylinder chamber and an inner bore of the piston.

In the present liquid purifying attachment, therefore, the container body need not be elastically contracted by squeezing hand pressure, to deliver the liquid out of the container, since the relatively higher pressure required for delivering the liquid can be easily obtained by the reciprocating movements of the piston. Thus, the present attachment may be considerably suitable for use with a pressure-intolerant, rigid or elastically non-deformable container made of a hard material.

The present liquid purifying attachment may be made simple and compact in construction, since the liquid delivery path extends through the inner bores in the cylinder and piston, and is thereby protected by these members. Accordingly, the present attachment may be suitably used with a relatively small-sized container, and is considerably handy to carry in the open air, for example.

The liquid delivery path may include: (a) an upstream liquid passage formed through a bottom wall of the cylinder, such that the upstream liquid passage is open at one end thereof for communication with the mass of liquid in the container, and located at the other end in the cylinder chamber; (b) a downstream liquid passage extending through the piston, such that the downstream liquid passage is open at one end thereof to the exterior space, and located at the other end in the cylinder chamber; and (c) a variable-length connecting passage disposed in the cylinder chamber, for connecting the upstream and downstream liquid passages with each other, while allowing for reciprocating movements of the piston in the cylinder chamber.

The cylinder may include an inner tube portion which protrudes from a bottom wall of the cylinder into the cylinder bore of the cylinder. In this case, the piston is fluid-tightly fitted on an outer circumferential surface of the inner tube portion such that the piston is longitudinally slidable relative to the inner tube portion, so that the inner tube portion extends through the cylinder chamber and an inner bore of the piston. The above-indicated liquid delivery path is formed within and defined by the inner tube portion of the cylinder.

BRIEF DESCRIPTION OF THE DRAWINGS

The foregoing and optional objects, features and advantages of the present invention will be better understood by reading the following detailed description of presently preferred embodiments, when considered in connection with the accompanying drawings, in which:

FIG. 2 is an elevational view in longitudinal cross section showing the construction of a cylinder used in the liquid purifying attachment of FIG. 1;

FIG. 3 is a top plan view taken in the direction 3—3 of FIG. 2;

FIG. 4 is an elevational view in longitudinal cross section showing the construction of a piston used in the attachment of FIG. 1;

FIG. 5 is a top plan view taken in the direction 5—5 of FIG. 4;

FIG. 14 is a bottom plan view depicting the lower closed end of the cylinder of the attachment of FIG. 12; and FIG. 15 is a schematic elevational view as seen from the right-hand side of FIG. 13.

DETAILED DESCRIPTION OF THE PREFERRED EMBODIMENTS

Figure 1:
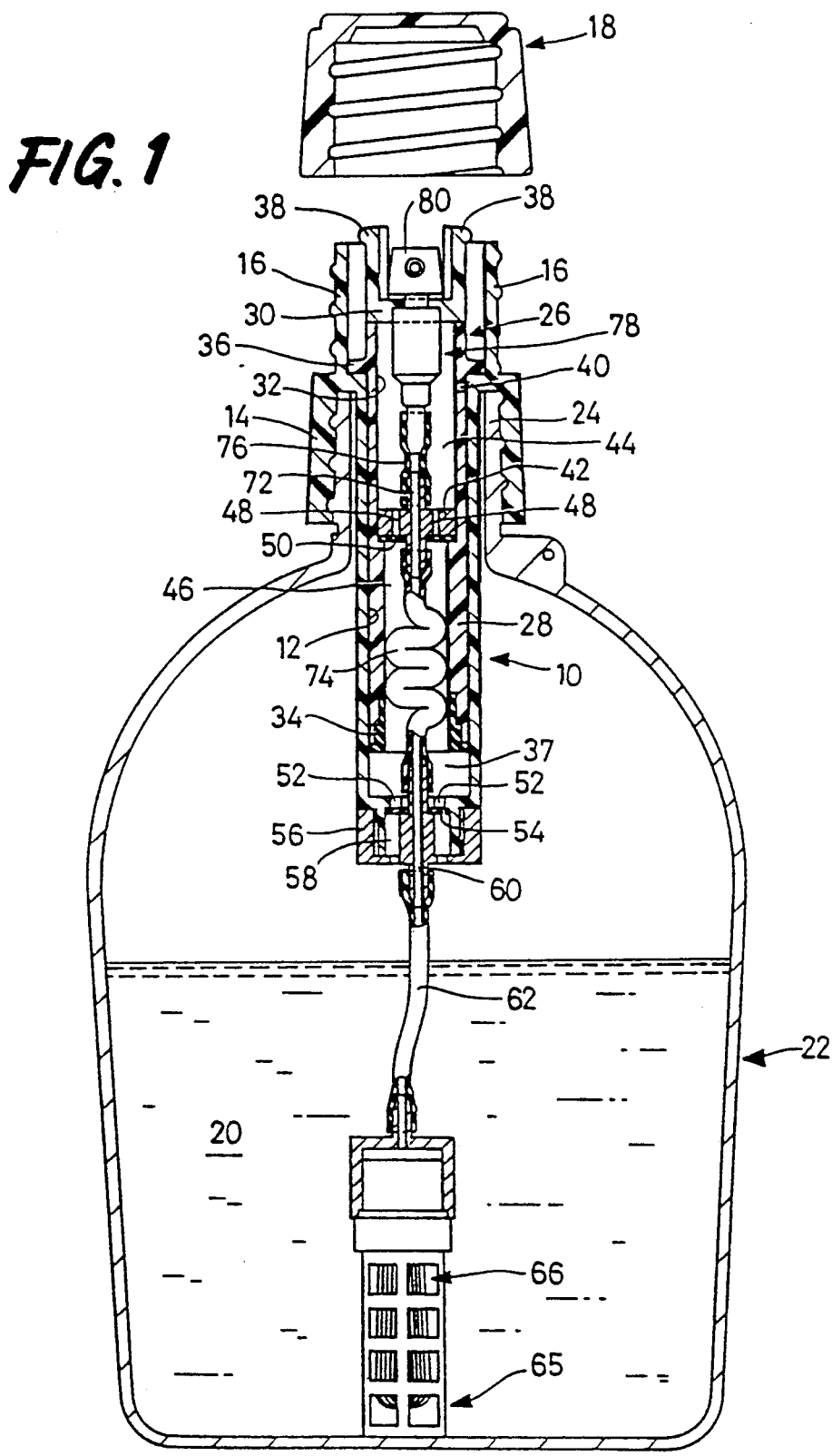
FIG. 1 is a schematic elevational view in longitudinal cross section of a liquid purifying attachment constructed according to one embodiment of the invention, when attached to a container which accommodates a liquid.

Referring first to FIG. 1 which shows a liquid purifying attachment of one embodiment of the invention as installed for use on a container 22, reference numeral 10 denotes a cylinder having a generally cylindrical shape which is open at one end thereof and closed at the other end. More specifically described referring also to FIGS. 2 and 3, the cylinder 10 has a cylinder bore 12 which is open at one longitudinal end thereof, and is formed at the open end integrally with an annular mounting portion 14 having an internally threaded inner surface. On an end face of the mounting portion 14, there are formed a pair of protection walls 16, 16 as integral parts of the cylinder 10. The protection walls 16 have a generally arcuate shape as viewed in transverse cross section of FIG. 3, and extend axially (longitudinally) outwardly from the open end of the cylinder 10. The protection walls 16 are externally threaded, for engagement with an internally threaded cap 18, so that the opening of the cylinder 10 is closed by the cap 18.

As shown in FIG. 1, the container 22 in the form of a bottle accommodates a mass of a desired liquid 20. The cylinder 10 is inserted through an opening of an externally threaded cylindrical bottleneck 24 formed at the upper end of the container 22, and is threaded or screwed at the mounting portion 14 on the bottleneck 24 of the container 22, such that the lower part of the cylinder 10 is accommodated in the container 22. Thus, the opening of the bottleneck 24 of the container 22 is pressure- or fluid-tightly closed by the cylinder 10 thus mounted on the container 22.

The cylinder bore 12 of the cylinder 10 receives a piston 26 having an outside diameter substantially equal to the diameter of the bore 12, such that the piston 26 is axially slidably reciprocable within the cylinder 10. The piston 26 has a cylindrical portion 28 which is closed at the upper end thereof by a lid 30 secured thereto. Thus, the piston 26 as a whole is formed as a generally cylindrical member which is closed at the upper end thereof and is open at the lower end, as shown in FIGS. 4 and 5.

The piston 26 is inserted into and disposed in the cylinder bore 12 of the cylinder 10, such that an opening of an inner bore 32 of the piston 26 is located at the lower part of the cylinder bore 12. An annular packing 34 is fixed to the open end portion of the piston 26, so that the piston 26 is axially slidable relative to the inner surface of the cylinder 10 while maintaining fluid-tightness between the piston 26 and the cylinder 10. With the piston 26 being received in the cylinder bore 12, there is defined a cylinder chamber 37 which is fluid-tightly closed by the piston 26 and the cylinder 10.

The piston 26 is formed at its closed or upper end portion with an annular protrusion 36, which protrudes radially outwardly from the outer circumferential surface of the piston 26. This annular protrusion 36 is adapted to abut on the end face of the mounting portion 14 of the cylinder 10, so as to determine the fully retracted position of the piston 26, which is established when the piston 26 is pushed down into the cylinder bore 12. The fully retracted position of the piston 26 is determined such that the volume of the cylinder chamber 37 in the cylinder bore 12 is sufficiently large even when the piston 26 is placed in the fully retracted position as described above.

The lid 30 of the piston 26 has a pair of generally arcuate guiding walls 38, 38 formed so as to extend outwardly from the peripheral portion of the outer surface thereof. These guiding walls 38, 38 are manually- or finger-operated to readily permit the piston 26 to be reciprocated in the cylinder bore 12 of the cylinder 10.

The piston 26 is provided with a disc-like partition plate 42 secured thereto, which is located in an intermediate portion of the inner bore 32 of the piston 26. The interior space of the inner bore 32 is divided by the partition plate 42 into an upper region 44 on the side of the lid 30, and a lower region 46 on the side of the open end of the piston 26. As is understood from FIG. 1 that the lower region 46 is open to the cylinder bore 12, and thus provides a part of the cylinder chamber 37 formed in the cylinder bore 12.

The upper region 44 communicates with the ambient air, through an air inlet 40 formed through the cylindrical wall of the piston 26 at its upper portion adjacent to and below the annular protrusion 36. The upper region 44 also communicates with the cylinder chamber 37 (lower region 46), through a plurality of through-holes 48 formed through the partition plate 42. The partition plate 42 is provided with a first check valve 50 in the form of a thin-walled rubber disc, which is fixed to the lower surface of the partition plate 42 so as to close the open ends of the through holes 48 which are open toward the cylinder chamber 37. This first check valve 50 permits a flow of the air from the upper region 44 into the cylinder chamber 37, but inhibits a flow of the air from the cylinder chamber 37 into the upper region 44.

In operation, when the piston 26 disposed in the cylinder bore 12 is pulled up from the fully retracted position to the fully advanced position, the pressure in the cylinder chamber 37 is reduced to be lower than the external atmospheric pressure, whereby the ambient air in the exterior space is introduced into the cylinder chamber 37, through the air inlet 40, the upper region 44 and the through-holes 48. Thus, in the instant embodiment, the air inlet 40, the upper region 44 and the through holes 48 constitute an air inlet passage for introducing the ambient air into the cylinder chamber 37.

The cylinder chamber 37 including the lower region 46 indicated above communicates with the interior storage space of the container 22, through a plurality of air-feed holes 52 formed through the bottom wall of the cylinder 10. A second check valve 54 in the form of a thin-walled rubber disc is fixed to the lower surface of the bottom wall of the cylinder 10 so as to cover and close the open ends of the air-feed holes 52 which are open toward the interior of the container 22. This second check valve 54 permits a flow of the air from the cylinder chamber 37 into the interior of the container 22, but inhibits a flow of the air from the interior space of the container 22 into the cylinder chamber 37. In FIGS. 1 and 2, reference numeral 56 denotes a valve support which is threaded on an annular extension formed on the lower end of the cylinder 10 so as to retain the second check valve 54 in position. The air-feed holes 52 formed in the cylinder 10 communicate with the interior space of the container 22, via an annular space 58 defined by the valve support 56 and the annular extension of the cylinder 10.

In operation, when the piston 26 located in the cylinder bore 12 is pushed down toward the fully retracted position, the pressure in the cylinder chamber 37 is raised to be higher than the external atmospheric pressure, and the air in the chamber 37 is compressed. The thus compressed air is then fed into the interior storage space of the container 22, due to the higher pressure in the cylinder chamber 37, through the air-feed holes 52 and the annular space 58. Thus, in the instant embodiment, the air-feed holes 52 and the annular space 58 constitute a compressed-air supply passage through which the compressed air in the cylinder chamber 37 is fed into the container 22.

It will be understood from the above description that the piston 26 is reciprocatingly moved in the longitudinal direction within the cylinder bore 12, so that the ambient air is sucked into the cylinder chamber 37 through the air inlet passage, and then compressed in the chamber 37, and so that the thus compressed air is fed into the interior space of the container 22, through the compressed-air supply passage. In this manner, the pressure in the interior storage space of the container 22 is elevated.

The valve support 56 threaded to the lower end of the cylinder 10 has a center hole 60 formed through the radially central portion thereof. This center hole 60 is open at one end thereof in the cylinder chamber 37 and at the other end in the interior storage space of the container 22. To the other open end of the center hole 60 on the side of the container 22, there is connected a flexible feed tube 62 which is submerged in the liquid 20 accommodated in the container 22. In the instant embodiment, the center hole 60 and the feed tube 62 constitute an upstream liquid passage which is open in the liquid 20 at one end thereof, and is located in the cylinder chamber 37 at the other end.

To the open end of the feed tube 62 of the upstream liquid passage which is open in the liquid 20, there is connected a protecting cover 65 which accommodates a micro-porous membrane filter in the form of a hollow or macaroni fiber module 66.

Figure 6:
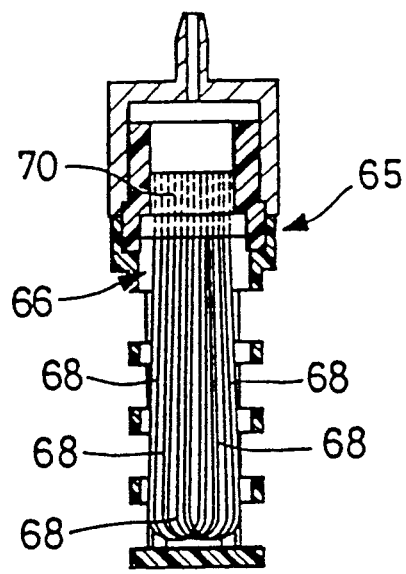
FIG. 6 is a fragmentary elevational view in longitudinal cross section illustrating a micro-porous membrane in the form of a hollow fiber module used in the attachment of FIG. 1.

As illustrated in FIG. 6, the hollow fiber module 62 accommodated in the protecting cover 65 includes a U-shaped array of a plurality of hollow fibers 68 each having a micro-porous wall structure, and a header 70 to which the end portions of the U-shaped array consisting of the opposite open ends of the fibers 68 are bonded with a suitable adhesive such as polyurethane resin. The module 66 is disposed in the protecting cover 65, with the header 70 fixedly or removably supported by the cover 65.

The opposite open ends of the micro-porous hollow fibers 68 of the module 66 are open to the feed tube 62 through an enclosed space within the protecting cover 65, such that the enclosed space is fluid-tightly sealed by the header 70 with respect to the liquid mass 20 accommodated in the container 22. Accordingly, the liquid 22 is permitted to flow into the feed tube 62 only through the wall of the hollow fibers 68 of the module 66.

The micro-porous wall structure of each of the multiple hollow fibers 68 of the module 66 has pores whose diameters are large enough to permit the molecules of the liquid 20 in the container 22 to pass therethrough, but are small enough to inhibit the passage of soil particles, bacteria or other contaminants (undesired particulate matters) in the liquid 20, thereby filtering out these contaminants. Preferably, in order to remove bacteria in the liquid 20, the diameters of the pores of the hollow fibers 68 are determined so that the micro-porous structure may remove or trap pseudomonas diminuta ATCC19146. Namely, a typical micro-porous structure of the fibers 68 should prevent the passage of particles having a diameter of 0.2-0.3 $\mu$m. When it is desired to filter off virus as well as bacteria, the micro-porous structure of the hollow fibers 68 should have smaller pores. For example, the diameters of the pores should be determined so as to prevent the passage of particles of at least 0.08 $\mu$m, 0.07 $\mu$m, and 0.025 $\mu$m, for the micro-porous structure to be able to remove influenza virus, Bovinerota virus, and polio virus and/or hepatitis B virus, respectively.

The micro-porous hollow fibers 68 may be made of high-molecule polymers, preferably, such as polyolefin, polyvinyl alcohol, polysulfone, polyacrylonitrile, cellulose acetate, polymethyl methacrylate and polyamide, by a suitable known method such as micro phase separating method or drawing method. In particular, the micro-porous hollow fibers made of polyolefin by a drawing technique are preferably used since the polyolefin hollow fibers are highly water-permeable but are highly capable of filtering out minute particles, and have at the same time a relatively high strength. Accordingly, the hollow polyolefin fibers are easily processed into the module 66 and are highly resistant to mechanical stresses during use.

When the liquid 20 is an aqueous solution, the micro-porous hollow fibers 68 preferably have a porous structure which exhibits sufficiently high hydrophilic property. When the polyolefin porous hollow fibers having hydrophobic property are used for filtering the aqueous solution, the hollow fibers should preferably be processed to give the porous structure hydrophilic property. When the liquid 20 is an olive oil or other oily liquid, it is desirable that the porous hollow fibers 68 exhibit hydrophobic property.

The partition plate 42 disposed in the inner bore 32 of the piston 26 has a center hole 72 formed through the central portion thereof in the longitudinal direction of the piston 26. The center hole 72 is located at one end thereof in the upper region 44 of the bore 32, and at the other end in the cylinder chamber 37 (the lower region 46). To the one open end of the center hole 72 located in the upper region 44, there is connected a dispenser 78 of a push-operated type, through a tube 76. The dispenser 78 has a fluid passage formed therethrough and through the lid 30 of the piston 26, so that the passage is open to the atmosphere. It will be understood from the above description that the center hole 72, the tube 76 and the fluid passage formed through the dispenser 78 constitute a downstream liquid passage which is open at one end thereof in the cylinder chamber 37, and is open at the other end to the atmosphere.

The push-operated type dispenser 78 partially defining the downstream liquid passage incorporates a check valve (not shown), and is adapted to dispense liquid under pressure. As well known in the art, the fluid passage in the dispenser 78 is normally closed, that is, the dispenser 78 is normally placed in its closed position, against the pressure of the liquid 20 flowing through the center hole 72 toward the dispenser 78. The dispenser 78 has an operating head 80 fixedly fitted on the upper end portion thereof, as shown in FIGS. 1 and 4. This head 80 is finger-operated to place the dispenser 78 in its open position so that the fluid passage in the dispenser 78 communicates with the center hole 72 of the partition plate 42. In this particular embodiment, the check valve incorporated in the dispenser 78 serves as third valve means for selectively opening or closing the downstream liquid passage as described above.

The lower open end of the center hole 72 on the side of the cylinder chamber 37 is connected to the center hole 60 formed through the bottom wall of the cylinder 10, by a connecting tube 74 which is accommodated in the cylinder chamber 37 to define a connecting passage for fluid communication between the center holes 72, 60.

The connecting tube 74 is formed of an elastic material such as rubber, and is normally folded several times in the cylinder chamber 37 (i.e., in the lower region 46 of the inner bore 32 of the piston 26). Accordingly, when the piston 26 is reciprocatingly moved in the cylinder bore 12 of the cylinder 10, the connecting tube 74 is elastically deformed to permit a change in the distance between the open ends of the center holes 60, 72 connected to the tube 74, while maintaining fluid communication between the central holes 60, 72.

With the center holes 60, 72 being connected to each other by the connecting tube 74, the upstream liquid passage 60, 62 is connected to and communicates with the downstream liquid passage 72, 76, 78, through the connecting passage defined by the connecting tube 74. As is apparent from the above description, the present embodiment has a liquid delivery path consisting of these upstream and downstream liquid passages and the connecting tube 74, through which the liquid 20 accommodated in the container 22 is delivered out of the container 22.

In the thus constructed liquid purifying attachment, the pressure in the container 22 is elevated by reciprocating the piston 26 in the cylinder bore 12 relative to the cylinder 10, between the fully retracted and fully advanced positions. In this condition, when the operating head 80 of the dispenser 78 is finger-pressed, the liquid 20 is delivered out of the container 22 through the above-described liquid delivery path, due to the higher pressure in the interior space of the container 22 than the external atmospheric pressure.

The instant liquid purifying attachment is capable of filtering or sterilizing the liquid 20 when it passes through the porous hollow fibers 68 of the hollow fiber module 66 connected to the lower open end of the flexible feed tube 62 which partially defines the upstream liquid passage. The hollow fibers 68 are adapted to remove undesired particulate matters contained in the liquid 20, such as soil particles, bacteria and virus, depending on the diameters of the pores in the microporous wall structure of the hollow fibers 68. It is to be understood that after the required amount of the liquid 20 is delivered out of the container 22, the delivery of the liquid 20 is stopped by releasing a finger pressure from the operating head 80.

In the instant liquid purifying attachment, the liquid delivery path through which the liquid 20 flows is normally closed by the check valve disposed in the dispenser 78 while the instant attachment is not in use. Further, while the liquid 20 is being delivered out of the container 22 with the dispenser 78 placed in the open position, the liquid 20 is forced to flow through the open dispenser 78, always in the direction toward the external open end of the liquid delivery path which is open to the atmosphere, due to the higher pressure in the container 22 than the external atmospheric pressure. Namely, in the open position of the dispenser 78, there may arise no flow of the liquid 20 and air in the reverse direction, through the liquid delivery path toward the interior space of the container 22. Accordingly, the liquid delivery path and the hollow fiber module 66 are effectively protected against dust and bacteria which would otherwise enter the instant liquid purifying attachment through the liquid delivery path.

In the liquid purifying attachment of the type described above, the liquid 20 is delivered out of the container 22 by utilizing the air pressure which is developed in the container 22 by the reciprocating movements of the piston 26. It follows that the container 22 may be made of a hard material since the container 22 need not be elastically contracted by squeezing hand pressure, to deliver the liquid.

Further, the instant liquid purifying attachment having all the necessary functions to purify the liquid is easily attached to the container 22, by simply screwing the mounting portion 14 of the cylinder 10 on the externally threaded cylindrical bottleneck 24 of the container 22. This favorably provides significant improvements in ease of handling and carrying of the attachment, and permits easy use of the attachment with high efficiency.

Furthermore, the liquid delivery path of the instant attachment is formed through the cylinder chamber 37 which is used to compress the air introduced from the exterior of the attachment, and to compress the air in the interior space of the container 22. Since both the compressed-air supply passage for feeding the compressed air into the container 22, and the liquid delivery path for delivering the liquid 20 out of the container 22 are substantially located in the same cylinder 10, the instant liquid purifying attachment may be made compact and small-sized. Accordingly, the instant attachment may be used with a relatively small-sized container, and assures considerably high portability in the outdoors.

In the instant liquid purifying attachment, the liquid delivery path formed through the cylinder chamber 37 is effectively protected by the cylinder 10 which surrounds the most part of the path. Accordingly, the instant liquid purifying attachment can be carried from one place to another, without suffering from undesirable damages to the liquid delivery path, assuring a high degree of durability.

In the instant embodiment, the hollow fiber module 66 which serves as the micro-porous membrane filter for filtering the liquid 20 has a relatively large filtering surface area, since the module 66 consists of an array of the multiple hollow fibers 68. Accordingly, the instant attachment permits a sufficiently large amount of the liquid 20 purified per unit time, i.e., a sufficiently high rate of delivery of the purified liquid 20, even when the liquid 20 is a comparatively viscous liquid. This favorably results in reducing the size of the attachment, and provides improvements in ease of handling or manipulation of the attachment.

Figure 8:
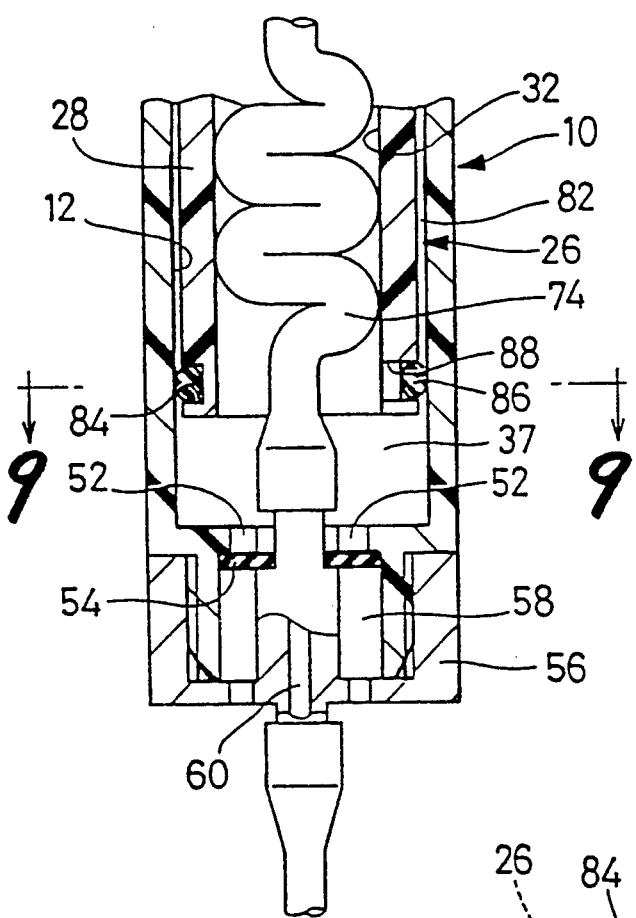
FIG. 8 is an enlarged fragmentary elevational view in cross section illustrating lower end portions of a piston and a cylinder of the attachment of FIG. 7.
Figure 9:
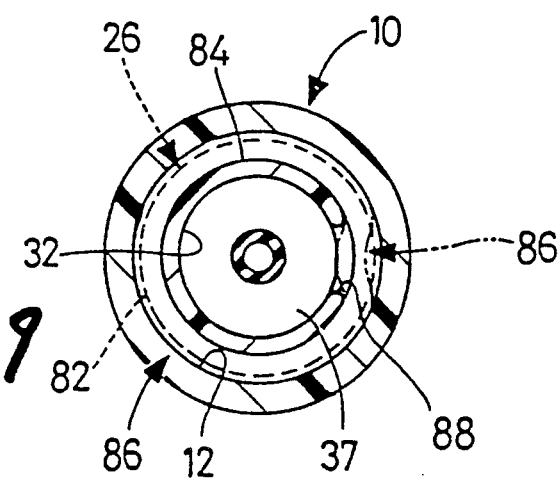
FIG. 9 is a cross sectional view taken along line 9—9 of FIG. 8.
Figure 7:
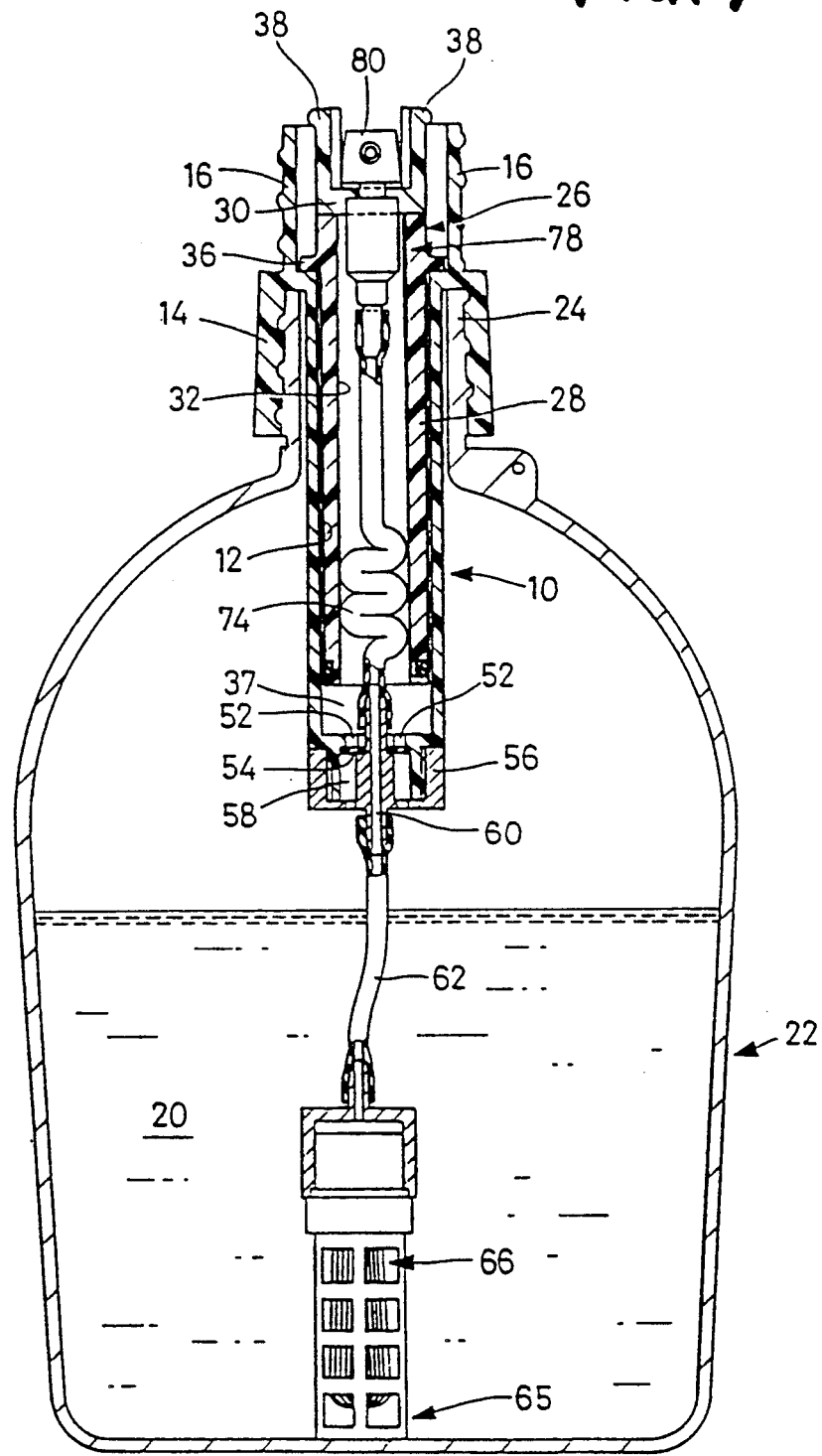
FIG. 7 is a schematic elevational view in longitudinal cross section of another embodiment of the liquid purifying attachment of the invention.

Referring next to FIGS. 7 through 9, another embodiment of the liquid purifying attachment will be described. This embodiment uses a modified form of the air inlet passage through which the air is introduced from the exterior space into the cylinder chamber, and a modified form of the first valve means disposed in the air inlet passage. In the interest of brevity and simplification, the same reference numerals as used with respect to the preceding embodiment will be used in FIGS. 7-9, to identify the functionally corresponding elements, and redundant description of these elements will not be provided.

In the instant modified embodiment, the cylindrical portion 28 of the piston 26 has an outside diameter slightly smaller than the inside diameter of the cylinder 10. Thus, there is formed a clearance 82 between the cylindrical portion 28 of the piston 26 and the cylindrical wall of the cylinder 10 which defines the cylinder bore 12. As shown in FIG. 8, an O-ring 86 is fitted in a circumferential groove 84 formed in the outer circumferential surface of the lower open end portion of the piston 26. The O-ring 86 functions to close the clearance 82, to thereby maintain air- or gas-tightness of the cylinder chamber 37.

As shown in FIGS. 8 and 9, the piston 26 has a window 88 formed at a circumferential part of the lower open end portion thereof which provides a bottom wall of the circumferential groove 84. The window 88 extends in the radial direction through the thickness of the bottom wall of the groove 84, and communicates with the groove 84 and the inner bore 32 of the piston 26. In this arrangement, the pressure in the cylinder chamber 37 acts on the O-ring 86 fitted in the groove 84, through the window 88.

When the piston 26 is pulled up to the fully advanced position, the pressure in the cylinder chamber 37 is reduced so that the reduced pressure in the chamber 37 is applied to the O-ring 86 through the window 88. As a result, a circumferential part of the O-ring 86 adjacent to the window 88 is sucked in and deformed radially inwards, i.e., toward the cylinder chamber 37, as indicated in a two-dot chain line in FIG. 9. Consequently, the sealing of the chamber 37 by the O-ring 86 is partially lost, and the clearance 82 formed between the piston 26 and the cylinder 10 is brought into communication with the cylinder chamber 37, so that the ambient air is sucked into the cylinder chamber 37 through the clearance 82.

When the piston 26 is pushed down toward the fully retracted position, the pressure in the cylinder chamber 37 is raised so that the relatively high pressure in the chamber 37 acts on the O-ring 86 through the window 88. As a result, the O-ring 86 is pushed radially outwardly against the inner circumferential surface of the cylindrical wall of the cylinder 10, thereby establishing the air-tightness of the cylinder chamber 37. Consequently, the air in the cylinder chamber 37 is effectively compressed by the downward movement of the piston 26.

It will be understood from the above description of the modified embodiment that the clearance 82 serves as the air-inlet passage for introducing the ambient air into the cylinder chamber 37, and that the O-ring 86 and window 88 serve as the first valve means for permitting a flow of the air from the clearance 82 into the cylinder chamber 37, and for inhibiting a flow of the air from the cylinder chamber 37 into the clearance 82.

In this modified embodiment, the first valve means is provided by using only the O-ring 86 for securing an air-tight sealing between the outer surface of the piston 26 and the inner surface of the cylindrical wall of the cylinder 10. Accordingly, the present liquid purifying attachment may be made relatively compact and small-sized owing to a reduced number of components required, as compared with the preceding embodiment.

Figure 10:
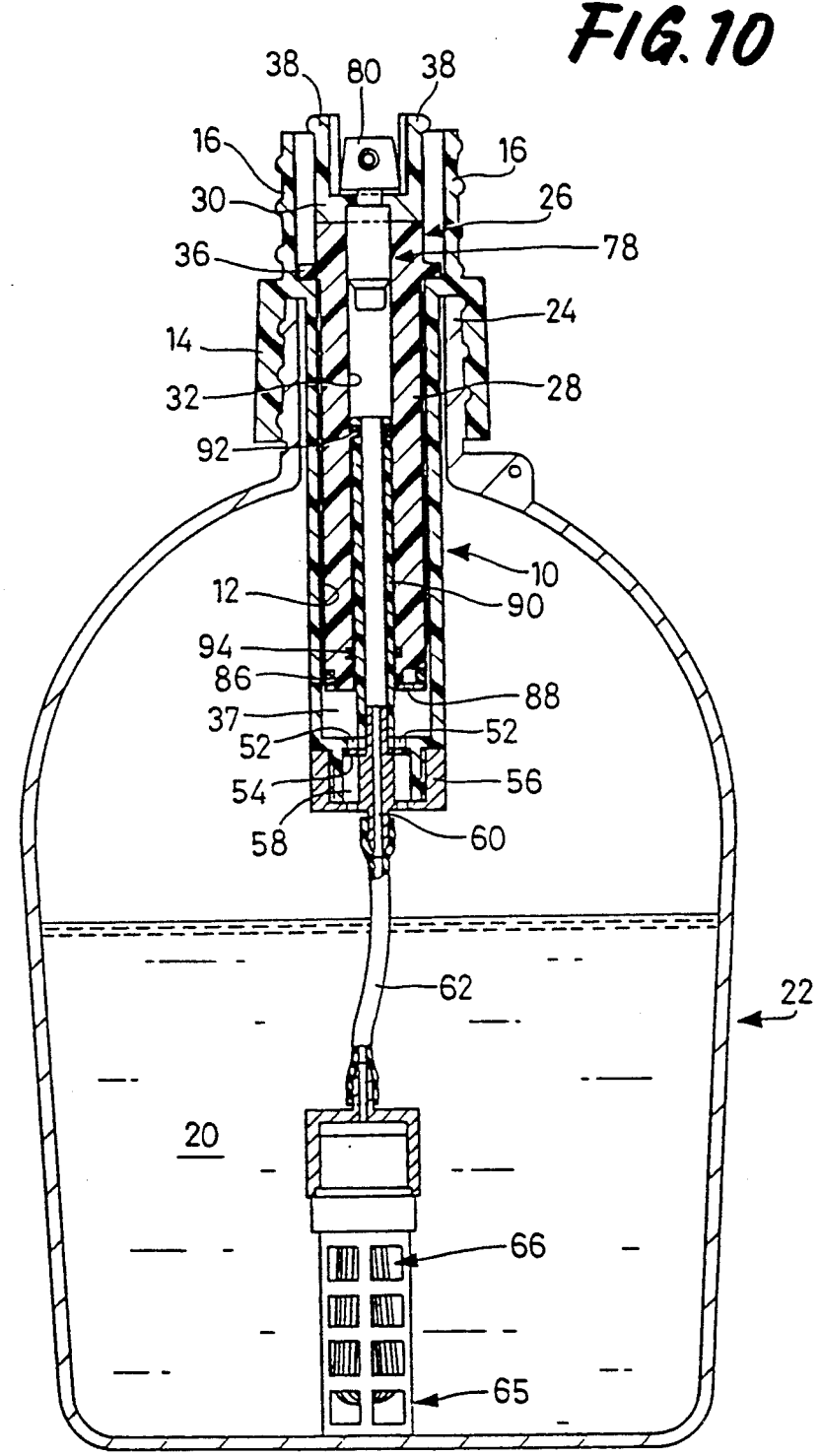
FIGS. 10 and 11 are schematic elevational views in longitudinal cross section of further embodiments of the liquid purifying attachment of the invention.

Reference is now made to FIG. 10 which shows a further embodiment of the liquid purifying attachment, which employs a connecting passage as a part of liquid delivery path, which passage is different from that of the preceding second embodiment of FIGS. 7–9. In the instant embodiment, too, the same reference numerals as used in the second embodiment will be used to identify the corresponding elements, and redundant description thereof will not be provided.

The present liquid purifying attachment has a cylindrical connecting sleeve 90 which is inserted in the inner bore 32 of the piston 26. This connecting sleeve 90 is connected to one open end of the center hole 60 (upstream liquid passage) formed through the valve support 56, which end is located in the cylinder chamber 37. The piston 26 is slidably movable in the longitudinal direction thereof relative to the connecting sleeve 90, and thus cooperates with the sleeve 90 to provide a variable-length connecting passage as described below. Between the outer circumferential surface of the connecting sleeve 90 and the inner circumferential surface of the piston 26, there are interposed two O-rings 92, 94 adapted to secure a fluid-tight sealing between these slidable surfaces of the sleeve 90 and piston 26.

The fluid passage formed through the dispenser 78 is open in the upper closed end portion of the inner bore 32 of the piston 26 which receives the connecting sleeve 90, such that the fluid passage in the dispenser 78 communicates with the inner bore 32. Thus, the center hole 60 of the valve support 56 as the upstream liquid passage is held in fluid communication with the fluid passage of the dispenser 78 as the downstream liquid passage, through an inner bore of the connecting sleeve 90 and the inner bore 32 of the piston 26.

As is apparent from the above description of the third embodiment, the connecting sleeve 90 and the piston 26 which are slidably movable relative to each other cooperate to define the variable-length connecting passage for connecting the upstream and downstream liquid passages, such that the length of the connecting passage is varied upon longitudinal reciprocating movements of the piston 26 within the cylinder bore 12 of the cylinder 10.

In this modified embodiment, the connecting passage of the liquid delivery path is provided by using the sleeve 90 made of a hard material such as synthetic resin, assuring a comparatively high degree of durability compared to the case where the connecting passage is provided by an elastic member as in the preceding embodiments.

Figure 11:
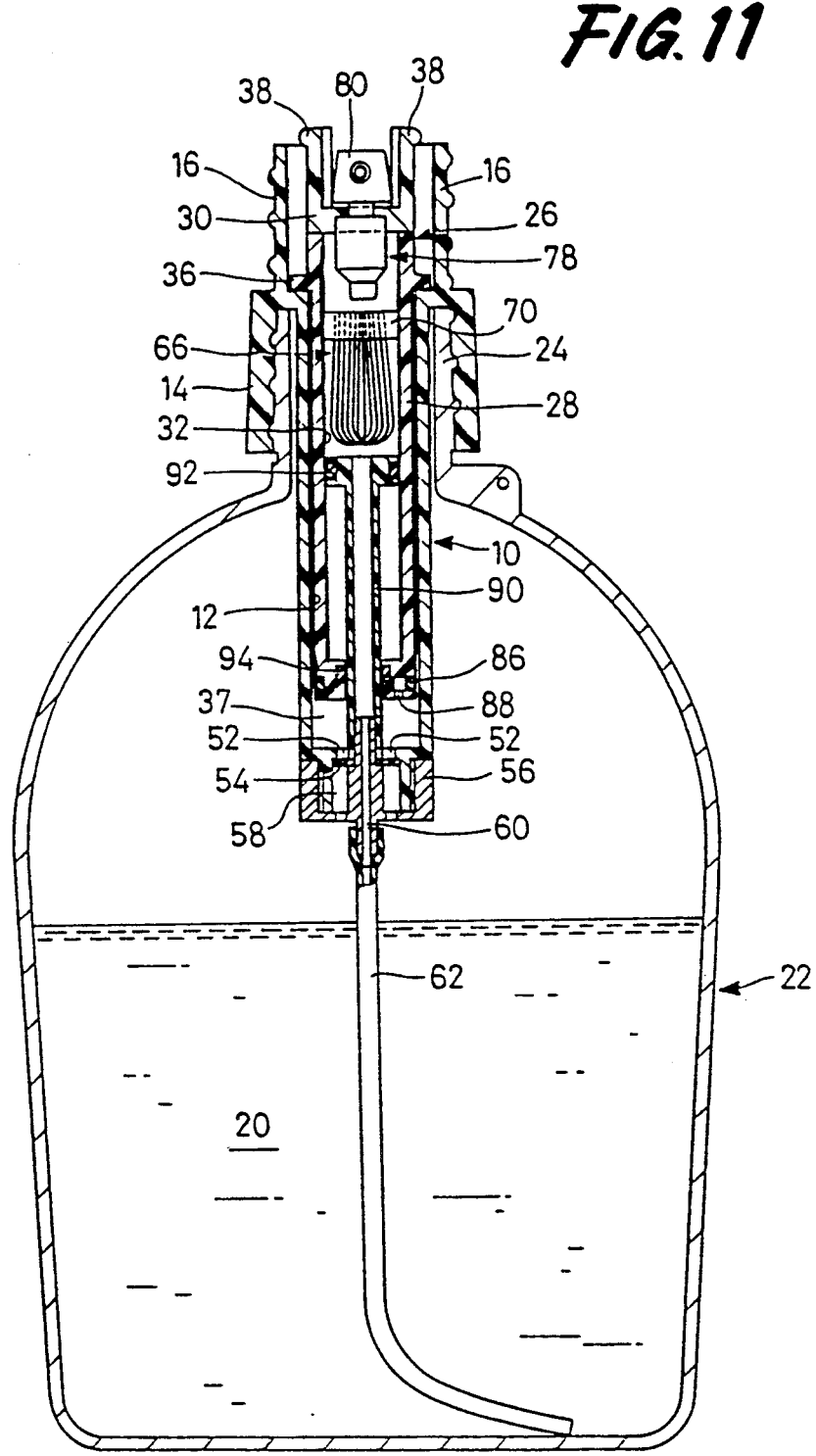

Referring next to FIG. 11, a still further embodiment (fourth embodiment) of the liquid purifying attachment will be described. This embodiment is similar to the preceding third embodiment, except the position of the hollow fiber module 66 as the micro-porous membrane filter. In the instant embodiment, too, the same reference numerals as used in the third embodiment will be used to identify the corresponding elements, and redundant description thereof will not be provided.

In the present liquid purifying attachment, the hollow fiber module 66 as the micro-porous membrane filter as shown in FIG. 6 is disposed in the upper closed end portion of the inner bore 32 of the piston 26, such that the header 70 for fixing the porous hollow fibers 68 together is fitted in the inner bore 32, and secured to the inner circumferential surface of the piston 26.

The inner bore 32 of the piston 26 is divided by the header 70 of the fiber module 66 into two fluid-tight sections. In operation, the liquid 20 which flows into the inner bore 32 of the piston 26 passes through the porous hollow fibers 68 of the fiber module 66, and then flows into the fluid passage of the dispenser 78 as the downstream liquid passage.

Since the hollow fiber module 66 is accommodated within the cylinder 10 in this modified embodiment, the present liquid purifying attachment may be made more compact or small-sized than the preceding embodiments, without suffering from damages to the module 66. Accordingly, the present attachment may be conveniently or readily carried from one place to another.

Reference next to FIGS. 12 through 15, another embodiment (fifth embodiment) of the liquid purifying attachment will be described. This embodiment employs a liquid delivery path through which the liquid 20 is delivered out of the container 22, which liquid delivery path is different from those of all the preceding embodiments. In this embodiment, too, the same reference numerals as used in the first embodiment will be used to identify the corresponding elements, and redundant description thereof will not be provided.

Figure 12:
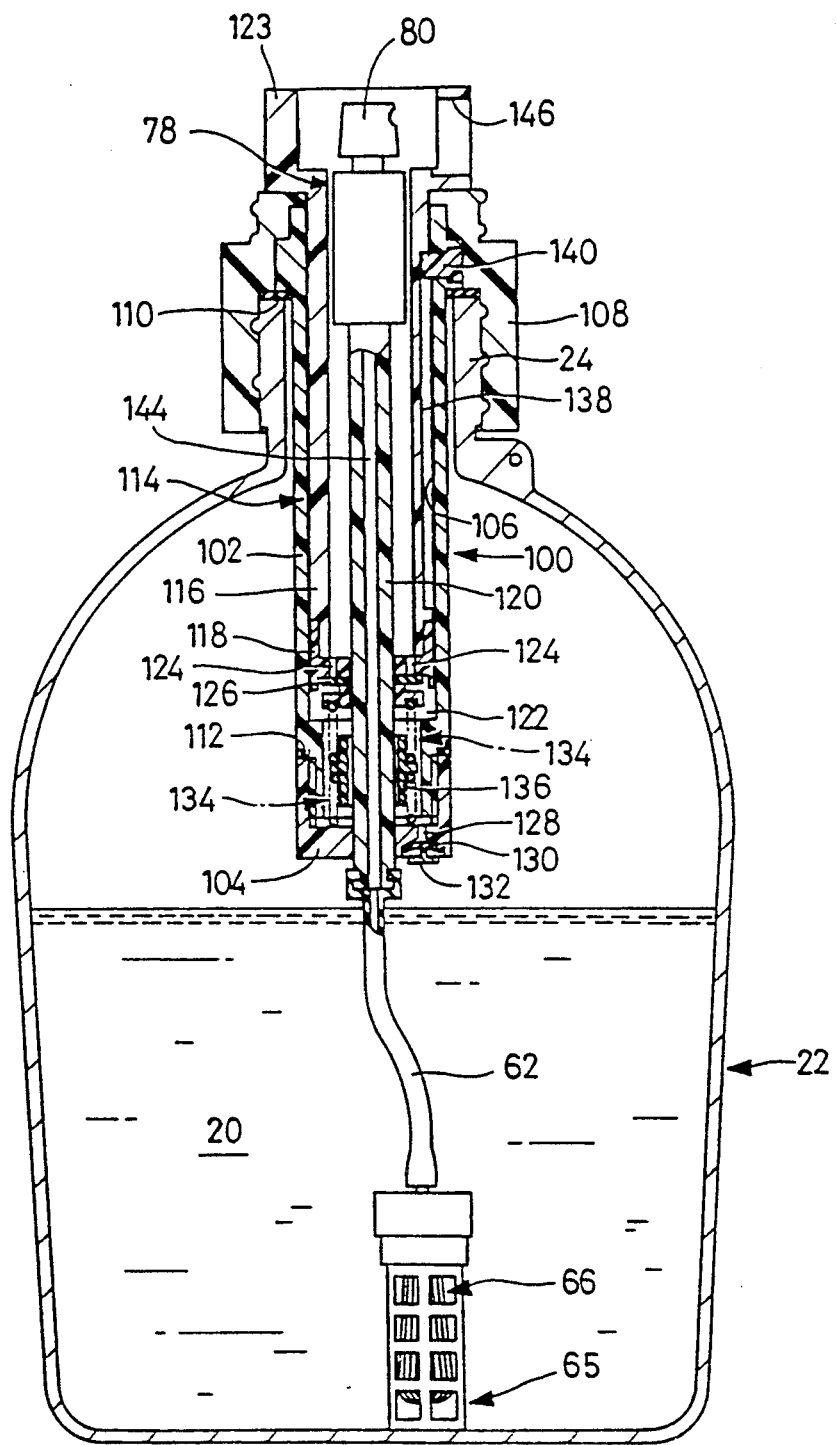
FIG. 12 is a schematic elevational view in longitudinal cross section of a still further embodiment of the liquid purifying attachment of the invention.
Figure 13:
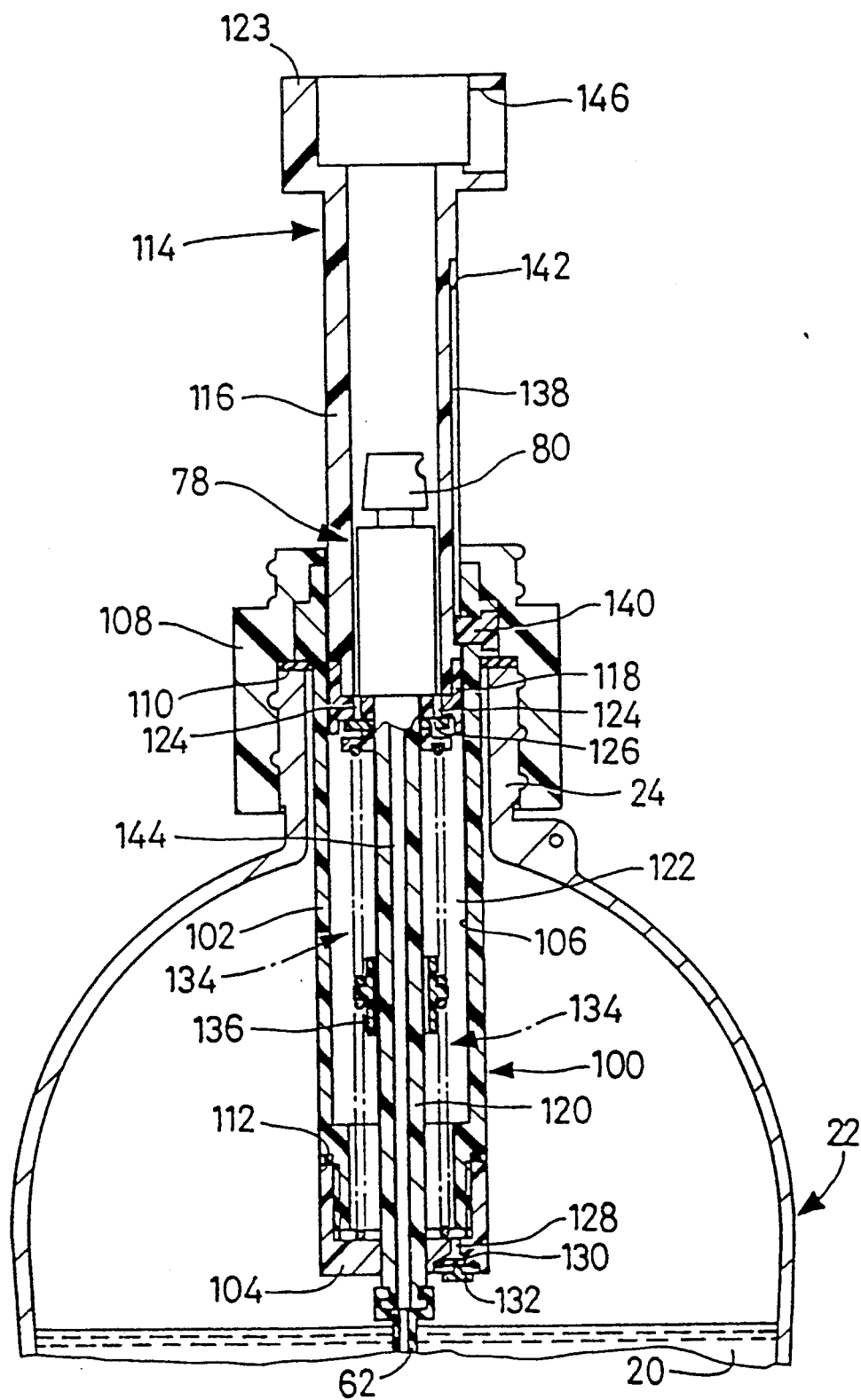
FIG. 13 is an elevational cross sectional view of the liquid purifying attachment of FIG. 12 when a piston is in the advanced position during use thereof.

In FIGS. 12 and 13, reference numeral 100 denotes a cylinder which has a generally cylindrical sleeve 102, and a cap-like member 104 that is fixedly threaded on the lower end portion of the sleeve 102. Thus, the cylinder 100 has a cylinder bore 106 formed therein, which is open at the upper end of the sleeve 102. Further, the sleeve 102 is formed at its upper end portion (on the side of the open end of the cylinder bore 106) with an annular mounting portion 108. With this mounting portion 108 being threaded on the bottleneck 24 of the container 22, the cylinder 100 is installed in place on the container 22. In these figures, reference numerals 110, 112 designate a sealing member provided between the cylinder 10 and the bottleneck 24, and a sealing member provided between the sleeve 102 and the cap-like member 104, respectively.

The cap-like member 104 of the cylinder 100 has an inner tube 120 fixed thereto, which extends through a central portion of the bottom wall of the member 104, in the longitudinal direction of the cylinder 100. This inner tube 120 is located within the cylinder bore 106, such that the inner tub 120 protrudes from the bottom wall of the cap-like member 104 toward the upper open end of the bore 106.

The cylinder 100 receives a piston 114 slidably in the cylinder bore 106. The piston 114 includes a generally cylindrical sleeve 116 which is formed at one open end thereof with a generally annular plate 118. The piston 114 is received in the cylinder bore 106, such that the annular plate 118 is located at the lower part of the bore 106 when the piston 114 is in the fully retracted position, and such that the piston 114, more precisely, the annular plate 118 is slidably fitted on the inner tube 120.

The annular plate 118 is accommodated in the cylinder bore 106 such that the inner and outer circumferential surfaces of the plate 118 is air-tightly slidable with respect to the outer circumferential surface of the inner tube 120 and the inner circumferential surface of the cylinder 100, respectively. With the piston 114 received in the cylinder bore 106, therefore, there is defined a cylinder chamber 122 which is air-tightly formed within the cylinder bore 106.

The piston 114 includes as an integral part thereof a cylindrical larger-diameter head portion 123 formed at the upper open end of the sleeve 116. In operation, the piston 114 may be reciprocated in the cylinder bore 106 by holding the head portion 123 between one's fingers. The head portion 123 is adapted to abut on the upper end face of the cylinder 100, and thereby serves to determine the fully retracted position of the piston 114.

The annular plate 118 of the piston 114 has a plurality of air inlets 124 formed therethrough, which permit the cylinder chamber 122 to communicate with the ambient air in the exterior space, through an inner bore of the sleeve 116. Further, the piston 114 has a first check valve 126 in the form of an annular rubber disc, which is fixed to the lower surface of the annular plate 118 so as to close the open ends of the air inlets 124 which are open to the cylinder chamber 122. This first check valve 126 permits a flow of the air from the exterior space into the cylinder chamber 112, but inhibits a flow of the air from the cylinder chamber 112 into the exterior space. In operation, when the piston 114 is pulled up toward the fully advanced position, the ambient air is introduced from the exterior space into the cylinder chamber 122, through the inner bore of the sleeve 116 and the air inlets 124, due to the lower pressure in the chamber 122 than the atmospheric pressure. Thus, an air inlet passage of the instant embodiment is constituted by the air inlets 124, and the inner bore of the sleeve 116 which communicates with the air inlets 124 and the exterior space.

In the instant embodiment, the annular plate 118 and the first check valve 126 are adapted to establish respective air-tight seals between the slidable inner and outer surfaces of the plate 118 and the inner tube 120, and between the slidable outer and inner surfaces of the plate 118 and the cylinder 100. However, it is possible to provide O-rings or other sealing members between the slidable surfaces of the plate 118 and the inner tube 120, and/or between the slidable surfaces of the plate 118 and the cylinder 100, so as to assure air-tightness of the cylinder chamber 122.

The cap-like member 104 of the cylinder 100 has an air-feed hole 128 formed therethrough so as to communicate with the cylinder chamber 122 and the interior storage space of the container 22. At the open end of the air-feed hole 128 on the side of the interior space of the container 22, there is provided a second check valve 130 which consists of a thin-walled rubber plate. The second check valve 130 permits a flow of the compressed air from the cylinder chamber 122 into the container 22, but inhibits a flow of the air from the container 22 into the cylinder chamber 122. Referring to FIG. 14, reference numeral 132 denotes a valve support which is secured to the lower surface of the cap-like member 104, and has a central protrusion adapted to press the second check valve 130 against the above-indicated open end of the air-feed hole 128. When the piston 114 is pushed down toward the fully retracted position, a compressed air is forced to flow from the cylinder chamber 122 into the interior space of the container 22 through the air-feed hole 128, due to the higher pressure in the chamber 122 than the pressure in the container 22. In the instant embodiment, the air-feed hole 128 serves as a compressed-air supply passage through which the compressed air is introduced into the container 22.

It will be understood from the above description that the piston 114 is reciprocatingly moved in the longitudinal direction within the cylinder bore 106, so that the ambient air is sucked into the cylinder chamber 122 through the air inlet passage 116, 124, and compressed in the cylinder chamber 122, and so that the thus compressed air in the chamber 122 is fed to the interior space of the container 22 through the compressed-air supply passage 128.

The cylinder chamber 122 accommodates two coil springs 134, 134 which are disposed in series with each other. Between these coil springs 134, there is interposed a slider 136 which is slidably fitted on the inner tube 120. As shown in FIG. 13, the piston 114 is biased in the direction away from the bottom wall of the cylinder bore 106, i.e., toward the fully advanced position, under the biasing force of the coil springs 134. During the reciprocating movements of the piston 114, therefore, the piston 114 automatically returns to its fully advanced position in which a substantial portion of the piston 114 protrudes upwards from the open end of the cylinder bore 106, as shown in FIG. 13.

Further, the piston 114 has an inverted L-shaped groove 138 formed in the outer circumferential surface of the sleeve 116 in the longitudinal direction thereof, as shown in FIG. 15. This L-shaped groove 138 consists of a longitudinally extending vertical portion 141, and a terminal portion 142 which extends in the circumferential direction from the upper longitudinal end of the vertical portion 141 on the upper side of the piston 114. On the other hand, the sleeve 102 of the cylinder 100 has an integrally formed engaging boss 140 which protrudes from the inner surface of the sleeve 102 into the L-shaped groove 138 formed in the piston 114. With the engaging boss 140 slidably engaging the vertical portion 141 of the groove 138, the piston 114 is allowed to be reciprocated in the longitudinal direction relative to the cylinder 100. When the piston 114 is not in use, the piston 114 is pushed down to the fully retracted position, and is rotated in the circumferential direction, so that the engaging boss 140 is brought into engagement with the terminal portion 142 of the groove 138. Thus, the piston 114 is held in its fully retracted position against the biasing force of the coil springs 134.

As discussed above, the inner tube 120 is fixed to the cylinder 100 so as to protrude into the cylinder bore 106. This inner tube 120 has a passage 144 formed therethrough, which communicates with the interior storage space of the container 22 in which the liquid 20 is accommodated, and the exterior space in which the ambient atmosphere is present.

The flexible feed tube 62 is connected at one end thereof to one open end of the passage 144 on the side of the interior space of the container 22, such that the passage 144 is open in the liquid 20 in the container 22, through the hollow fiber module 66 attached to the other end of the feed tube 62.

To the other open end of the passage 144 on the side of the exterior space is connected the push-operated type dispenser 78, which includes the third check valve for selectively opening and closing the fluid passage formed therethrough. When the operating head 80 of the dispenser 78 is finger-pressed, the passage 144 formed through the inner tube 120 is brought into communication with the ambient atmosphere in the external space.

The dispenser 78 is suitably dimensioned such that the dispenser 78 may be accommodated in an inner bore of the sleeve 116 of the piston 114. Further, the dispenser 78 does not protrude from the upper open end of the sleeve 116 (or piston 114) even when the piston 114 is moved to the fully retracted position as shown in FIG. 12. Namely, the dispenser 78 is always located within the inner bore of the sleeve 116, without interfering with the reciprocating movements of the piston 114. With the piston 114 being moved to the fully retracted position, the liquid 20 in the container 20 is delivered from the dispenser 78, through a window 146 formed through the head portion 123 of the sleeve 116.

In this modified embodiment, the passage 144 extending through the inner tube 120 cooperates with the flexible feed tube 62 and dispenser 78 connected to its opposite ends to constitute a liquid delivery path through which the liquid 20 is delivered out of the container 22.

In the instant liquid purifying attachment constructed as described above, the liquid delivery path is defined by a considerably simple structure which does not include a flexible connecting member or other variable-length connecting means as used in the preceding embodiments.

Accordingly, the liquid purifying attachment of the instant embodiment may be produced with high efficiency, at a reduced cost, assuring significantly improved durability.

In the liquid purifying attachment of this modified embodiment, the coil springs 134 for biasing the piston 114 in the direction away from the bottom wall of the cylinder 100 facilitate the operation of reciprocating the piston 114 relative to the cylinder 100. This favorably results in an improvement in ease of manipulation of the attachment.

While the present invention has been described in detail in its presently preferred embodiments, for illustrative purpose only, it is to be understood that the invention is not limited to the details of the illustrated embodiments.

For improving ease of manipulation of the piston, the piston 26 may be provided with an operating head portion having a proper configuration, other than the guiding walls 38 and the head portion 123 as employed in the illustrated embodiments. For example, the piston may include a collapsible or a removable operating head portion.

For facilitating the operation of the piston, the pressure of the compressed air may be utilized as biasing means for biasing the piston 26 in the direction away from the fully retracted position, instead of the coil springs as used in the fifth embodiment.

The structure for defining the connecting passage is not limited to the connecting tube of a folding type as used in the first embodiment, or the connecting sleeve and the piston which are slidably movable relative to each other as in the second and third embodiments. Namely, the connecting passage may be defined by any structure which can maintain the fluid communication between the upstream and downstream liquid passages while permitting the longitudinal movement of the piston 26 in the cylinder bore 12 during the operation of the piston 26. For example, a bellows type structure, an elastically expandable and contractible tube, a flexible curled, spiral, helical or similarly formed pipe, and various other structures may be employed.

In the illustrated embodiments, the flexible feed tube 62 provides a portion of the liquid delivery path which is open in the interior storage space of the container 22. However, it is possible to eliminate the flexible feed tube 62, and permit the liquid delivery path formed through the cylinder 10, 100 to be open directly in the liquid mass 20 within the container 22, depending upon the shape of the container 22.

Further, the location of the hollow fiber module 66 is not limited to those of the illustrated embodiments, but may be selected as desired along the liquid delivery path.

While the micro-porous hollow fibers are used in the illustrated embodiments as a micro-porous membrane filter disposed in the liquid delivery path, for removing bacteria and other contaminants from a flow of the liquid dispensed from the container, other filters such as a planar micro-porous membrane may be used.

The micro-porous membrane filter used in the invention has pores whose diameters are suitably determined so as to inhibit the passage of undesired matters, such as mud, sand, soil and dust, and microorganisms, bacteria and virus, for assuring sufficient filtering capability depending upon the application or utility of the purified liquid, for example.

The specific structures of the first, second and third valve means are not limited to those of the illustrated embodiments. In particular, the third valve means may be provided by various other known valves, provided that the valve can be manually placed in its open and closed positions.

The liquid purifying attachment constructed according to the present invention is capable of dispensing drinking water for use in an emergency, sterile water or liquid that is used for: cleaning hands of people in the open air; cleaning wounds of a body; preparing a drug; cleaning human eyes; cleaning medical goods or facilities or instruments in the open air; and other liquids used in the field of medical treatment. The present attachment is also capable of dispensing warm water which is favorably used for cleaning a body of a wounded person (patient). In addition, the container equipped with the instant liquid purifying attachment is suitably used as a container for dispensing and/or storing a pharmaceutical liquid, for example, as a spray bomb for a sterile disinfecting solution used for disinfecting wounds, or as a feeding or spout cup for a patient.

It will be understood that the invention may be embodied with various other changes, modifications and improvements which may occur to those skilled in the art, without departing from the spirit of the invention defined in the appended claims.

What is claimed is:

1. A liquid purifying attachment for dispensing a liquid, which is attached to a container having an enclosed interior space in which a mass of said liquid is stored, said container including a bottleneck having an opening through which said liquid is introduced, comprising:

a cylinder having a mounting portion fluid-tightly attached to said bottleneck of said container, such that said cylinder is partially inserted in said enclosed interior space of said container, said cylinder having a cylinder bore which is open at said mounting portion to an exterior space outside of said container;

a piston fluid-tightly fitted in said cylinder bore such that said piston is slidably movable in a longitudinal direction thereof, between a fully retracted and a fully advanced position thereof, relative to said cylinder, said piston cooperating with said cylinder to define a cylinder chamber which is normally fluid-tightly enclosed;

means for defining an air inlet passage which communicates with said exterior space and said cylinder chamber, for introducing an ambient air from the exterior space into said cylinder chamber when said piston is moved toward said fully advanced position;

first valve means, disposed in said air inlet passage, for permitting a flow of the air therethrough from the exterior space into said cylinder chamber, and for inhibiting a flow of the air therethrough from said cylinder chamber into the exterior space;

means for defining a compressed-air supply passage which communicates with said cylinder chamber and said interior space of said container, the air which is compressed in said cylinder chamber being fed into said container through said compressed-air supply passage when said piston is moved toward said fully retracted position;

second valve means, disposed in said compressed-air supply passage, for permitting a flow of the compressed air therethrough from said cylinder chamber into the interior space of said container, and for inhibiting a flow of the air therethrough from said interior space into said cylinder chamber;

a liquid delivery path including at least a portion formed through said cylinder and said piston so as to extend through said cylinder chamber, said liquid delivery path having one open end adapted to be submerged in said mass of the liquid, and the other open end exposed to said exterior space;

third valve means, disposed in said liquid delivery path, for selectively closing and opening the liquid delivery path; and filtering means for purifying said liquid delivered out of said container through said liquid delivery path, said filtering means consisting essentially of a micro-porous membrane filter disposed so as to partially define said liquid delivery path.

2. A liquid purifying attachment according to claim 1, wherein said liquid delivery path comprises:

an upstream liquid passage formed through a bottom wall of said cylinder, such that said upstream liquid passage is open at one end thereof for communication with said mass of liquid in said container, and located at the other end in said cylinder chamber;

a downstream liquid passage extending through said piston, such that said downstream liquid passage is open at one end thereof to said exterior space, and located at the other end in said cylinder chamber; and a variable-length connecting passage disposed in said cylinder chamber, for connecting said upstream and downstream liquid passages with each other, while allowing for reciprocating movements of said piston in said cylinder chamber.

3. A liquid purifying attachment according to claim 2, wherein said upstream liquid passage is at least partially defined by a flexible tube which is connected at one end thereof to said cylinder, and is submerged at the other end in said mass of liquid in said container.

4. A liquid purifying attachment according to claim 3, wherein said micro-porous membrane filter is connected to the other end of said flexible tube, such that said flexible tube communicates with said mass of liquid through said micro-porous membrane filter.

5. A liquid purifying attachment according to claim 2, further comprising a dispenser having a check valve as said third valve means, and a fluid passage formed therethrough and communicating with said ambient air, said downstream liquid passage including said fluid passage of said dispenser.

6. A liquid purifying attachment according to claim 2, further comprising a connecting tube made of an elastic material, which defines said variable-length connecting passage.

7. A liquid purifying attachment according to claim 2, further comprising a connecting sleeve which is fixed to said bottom wall of said cylinder so as to extend into said bore of the cylinder, and which is slidably fitted in said piston so as to cooperate with said piston to define said variable-length connecting passage.

8. A liquid purifying attachment according to claim 7, wherein said micro-porous membrane filter is disposed in an inner bore of said piston which partially defines said variable-length connecting passage.

9. A liquid purifying attachment according to claim 1, wherein said cylinder includes an inner tube portion which protrudes from a bottom wall of said cylinder into said cylinder bore of said cylinder said piston being fluid-tightly fitted on an outer circumferential surface of said inner tube portion such that said piston is longitudinally slidable relative to said inner tube portion, so that said inner tube portion extends through said cylinder chamber and an inner bore of said piston, said liquid delivery path being formed within and defined by said inner tube portion.

10. A liquid purifying attachment according to claim 9, wherein said air inlet passage includes said inner bore of said piston, and a plurality of suction holes formed through a bottom wall of said piston, and wherein said first valve means is provided at open ends of said suction holes which are open to said cylinder chamber.

11. A liquid purifying attachment according to claim 1, further comprising a partition member disposed in said piston for dividing an inner bore of said piston into an upper region and a lower region, said upper region communicating with the ambient air through at least one first hole formed through said piston, and communicating with said lower region as said cylinder chamber, through at least one second hole formed through said partition member, said air inlet passage consisting of said at least one first hole, said upper region and said at least one second hole.

12. A liquid purifying attachment according to claim 11, wherein said first valve means comprises a thin rubber disc provided at an open end of said at least one second hole which is open to said cylinder chamber.

13. A liquid purifying attachment according to claim 1, wherein said compressed-air supply passage includes at least one third hole formed through a bottom wall of said cylinder, and wherein said second valve means comprises a thin rubber disc provided at an open end of said at least one third hole which is open to said interior space of said container.

14. A liquid purifying attachment according to claim 1, wherein said micro-porous membrane filter comprises an array of micro-porous hollow fibers, each of which has a micro-porous wall structure having a pore size determined so as to permit passage of said liquid therethrough but inhibit passage of foreign matters contained in said liquid.

15. A liquid purifying attachment according to claim 1, wherein said air inlet passage includes a clearance formed between an outer surface of said piston and an inner surface of said cylinder.

16. A liquid purifying attachment according to claim 15, wherein said first valve means comprises an O-ring for selectively opening and closing said clearance for selective communication with said cylinder chamber.

17. A liquid purifying attachment according to claim 1, further comprising at least one coil spring which biases said piston toward said fully advanced position.

18. A liquid purifying attachment according to claim 1, wherein said piston has an L-shaped groove formed in an outer circumferential surface thereof, said L-shaped groove consisting of a vertical portion extending in a longitudinal direction of said piston, and a terminal portion which is formed in a circumferential direction of said piston and which is connected to one of opposite ends of said vertical portion which is nearer to said other end of said liquid delivery path than to said one end of said liquid delivery path, said cylinder having an engaging portion formed on an inner circumferential surface thereof engaging said vertical groove when said piston is moved between said fully retracted and fully advanced positions, and engaging said terminal portion when said piston is locked in said fully retracted position.

19. A liquid purifying attachment according to claim 18, further comprising biasing means for biasing said piston toward said fully advanced position, said engaging portion of said cylinder and said terminal portion of said L-shaped groove engaging each other to hold said piston in said fully retracted position against a biasing action of said biasing means.

20. A liquid purifying attachment to a bottleneck of a container, for dispensing a liquid contained in said container, said attachment comprising:

air compressing means for compressing an ambient air and feeding the compressed air into an interior space of said container, so as to raise a pressure in said interior space for forcing said liquid to leave said container, said air compressing means including a cylinder, a piston and air valve means, said cylinder being fixed to said bottleneck of said container, so as to partially extend into said interior space of said container and fluid-tightly close said interior space, said piston being fluid-tightly received in said cylinder so as to cooperate with said cylinder to define a cylinder chamber, said piston being reciprocatingly moveable between a fully retracted and a fully advanced position, for introducing ambient air into said cylinder chamber upon movement of said piston toward said fully advanced position and for compressing the introduced air in said cylinder chamber and feeding the compressed air into said interior space upon movement of said piston toward said fully retracted position, said air valve means permitting flows of said ambient air and said compressed air into said cylinder chamber and said interior space, respectively, and inhibiting flows of said ambient air and compressed air from said cylinder chamber and said interior space, respectively; and liquid delivery means for defining a liquid delivery path for feeding said liquid in said interior space out of said container, in the presence of said pressure in said interior space which has been raised by said air compressing means, said liquid delivery means including filtering means for filtering out foreign matters included in said liquid, before said liquid is delivered out of said container.

21. A liquid purifying attachment according to claim 20, wherein said liquid delivery means includes liquid valve means manually operable between an open position for permitting said liquid to be delivered out of said container, and a closed position for inhibiting said liquid from being delivered out of said container.

22. A liquid purifying attachment according to claim 21, wherein said liquid delivery means includes a dispenser which incorporates said liquid valve means and which is fixed to said piston so as to allow an access thereto for operation of said liquid valve means between said open and closed positions.

* * * * *